United States Patent [19]

Hernandez et al.

[11] Patent Number: 4,674,042

[45] Date of Patent: Jun. 16, 1987

[54] EDITING BUSINESS CHARTS

[75] Inventors: Irene H. Hernandez, Austin; Barbara A. Barker, Round Rock; Carol S. Himelstein; Beverly H. Machart, both of Austin, all of Tex.

[73] Assignee: International Business Machines Corp., Armonk, N.Y.

[21] Appl. No.: 719,233

[22] Filed: Apr. 2, 1985

[51] Int. Cl.⁴ ............................................. G06F 3/153
[52] U.S. Cl. .................................. 364/401; 364/900; 364/521
[58] Field of Search ............... 364/401, 518, 521–522, 364/900 MS File; 340/722, 709, 710

[56] References Cited

U.S. PATENT DOCUMENTS

| | | | |
|---|---|---|---|
| 4,303,973 | 12/1981 | Williamson | 340/722 |
| 4,355,805 | 10/1982 | Baer | 340/709 |
| 4,555,699 | 11/1985 | Citron | 340/709 |

FOREIGN PATENT DOCUMENTS

| | | | |
|---|---|---|---|
| 3003774 | 8/1981 | Fed. Rep. of Germany | 340/722 |
| 82/00726 | 3/1982 | PCT Int'l Appl. | 340/722 |

Primary Examiner—Jerry Smith
Assistant Examiner—G. Hayes
Attorney, Agent, or Firm—C. Lamont Whitham

[57] ABSTRACT

A method is disclosed for interactively manipulating a business chart as a group of draw graph objects. The chart is displayed using predefined data. A draw graph object of the business chart is selected for editing. When the editing action is completed, a check is made to determine whether the action on the business chart destroyed the relationship between the chart and the predefined data. If it did, a message is displayed to the operator indicating that the link between the chart and the data has been broken.

9 Claims, 7 Drawing Figures

FIG. 3
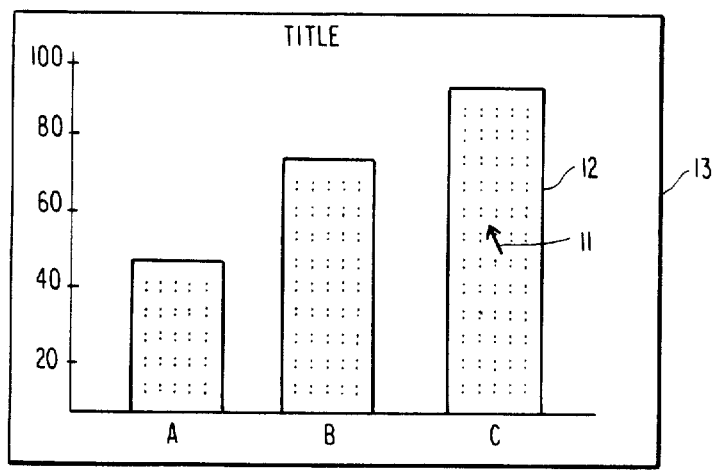
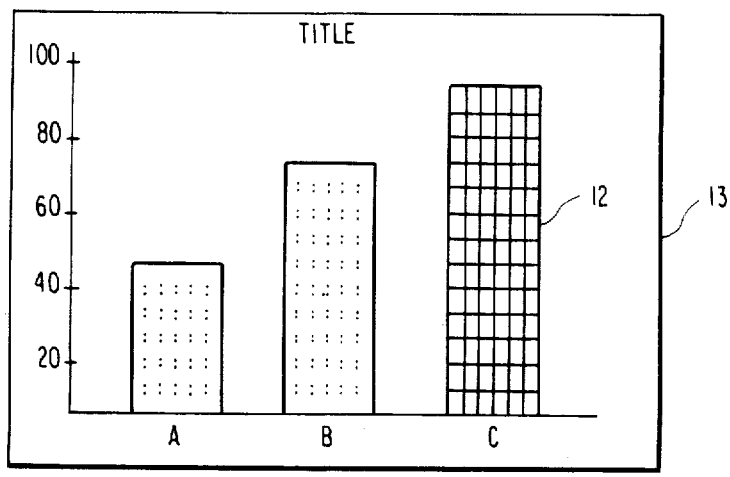
FIG. 4

FIG.5
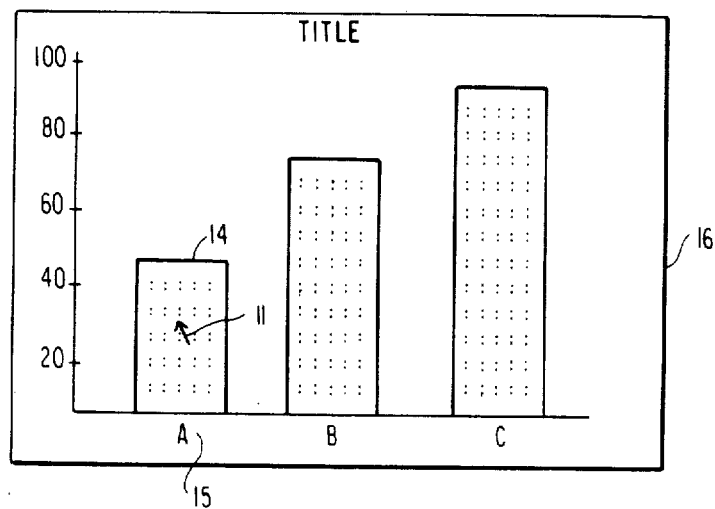
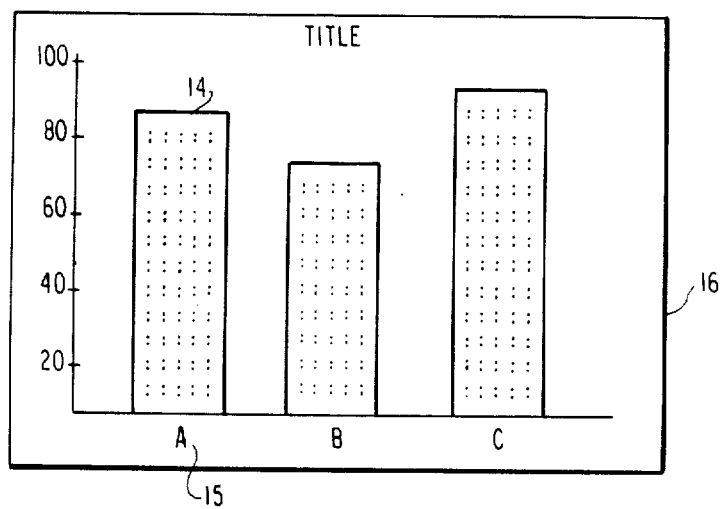
FIG.6

EDITING BUSINESS CHARTS

DESCRIPTION

1. Technical Field

The present invention generally relates to creating business graphs with a computer and, more particularly, to a method of interactively manipulating a business chart as a group of draw graph objects.

2. Prior Art

Application programs for generating business graphics such as line graphs, bar charts and pie charts have been quite popular in the presentation of business data such as sales, budgets and the like. Generally, these programs require the input of the data and the format of the chart (i.e., line, bar, pie, scatter, etc.), and from this information, the business graph is generated for display, printing and/or plotting. Usually, one or more methods is provided for the input of the data. The user can manually enter the data according to a predefined program format or specify that the data be retrieved from a data file created by a data base program or a spreadsheet program. In the latter case, the data is transported automatically to the businsess graphics program after the user has defined the source for the data, the format of the chart including type and attributes and any headings, legends, titles, labels or other textual type annotation.

However, there are some cases where the operator may want to enhance the business graph by editing the chart components, such as the lines, bars, points or pie wedges, that represent the data. That is, the operator may want to select one bar in a bar chart and stretch the bar to emphasize what profits might have been for the last quarter of 1984, for example, if the sales level for the first three quarters of the year had been maintained. In a pie chart, the operator might want to move the side of a wedge up or down to illustrate a projected sales percentage for the coming year. For added emphasis and clarity, the user might want to move or rotate the exploded section of a pie chart. Therefore, what is needed is a program that allows the operator to edit and manipulate the components of a business graph in the same manner that components of a draw graph picture are edited.

SUMMARY OF THE INVENTION

It is therefore an object of the subject invention to provide improvements in computer software for implementing application programs that generate business charts.

It is another more specific object of the invention to provide a way to manipulate a business chart as a group of draw graph objects.

It is a further object of the invention to provide a mechanism which facilitates editing of the objects that represent the data used to generate the chart so that the chart is no longer linked to the data.

According to the invention, an application program is provided which allows the operator to create a business chart from a predefined set of data or from keyed input queried by the system. A chart is composed of draw graph objects such as lines, bars, circles, text, and the like required to present the data in a graph form. When the chart is created, a link between the chart and the data is also created. As long as the integrity of the data is not compromised, this link is maintained.

Since a business chart implies a grouping of data, the application program groups together all the objects required to create the chart or graph. Although the chart is a group of objects, the operator has the option of manipulating any of the objects comprising the group as well as the entire group. Enhancements to the chart can be made by selecting any of the objects in the chart and changing one or more of the attributes such as color, fill pattern, character font or the like. Since these enhancements do not change the data represented by the chart, the link between the chart and the data is maintained. However, if a different representation of the data is desired without acutally editing the data, any of the objects can be stretched, shrunk, scaled or moved until the desired modifications to the chart have been achieved. At this point, if the graphical representation of the data no longer reflects the predefined data, the link is broken. It is to be assumed that all chart objects and commands are selectable via a cursor that is typically controlled by a mouse or similar device.

BRIEF DESCRIPTION OF THE DRAWINGS

The foregoing and other objects, aspects and advantages of the invention will be better understood from the following detailed description of the invention with reference to the drawings, in which:

FIG. 3, illustrates a bar chart in which a single bar is selected for editing;

FIG. 4 illustrates the result of editing the selected bar in the bar chart of FIG. 3;

FIG. 5 illustrates another bar chart in which a single bar has been selected for editing;

FIG. 6 illustrates the result of editing the selected bar in the bar chart of FIG. 5.

DETAILED DESCRIPTION OF A PREFERRED EMBODIMENT OF THE INVENTION

Figure 1:
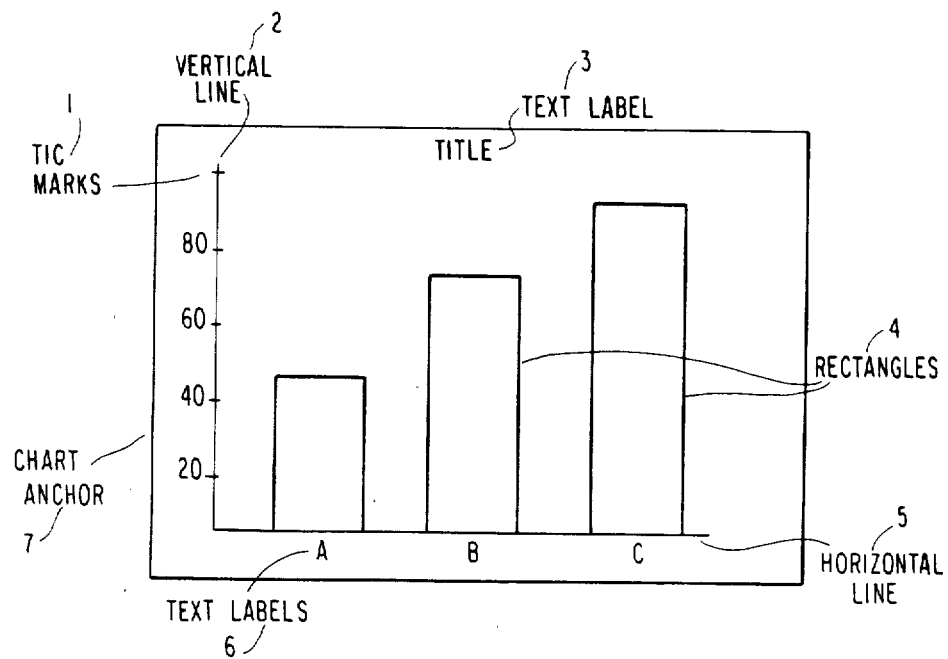
FIG. 1 is a bar chart composed of several primitive draw graphic objects.

For a more detailed understanding of the invention, reference is first made to FIG. 1 of the drawings In this figure, there is illustrated a bar chart which is composed of several draw graphic primitive objects. The chart is composed, for example, of tic marks 1 representing the scaling amount for the data, vertical line 2 representing the y-axis, a title 3 representing the chart title, rectangles 4 which represent the individual bars, horizontal line 5 representing the x-axis, and labels 6 representing the names associated with the data in the chart. The primitive objects are grouped together to form a representation of a bar chart. Chart anchor 7 is used as a handle for selecting the entire bar chart for editing, for example.

Figure 2:
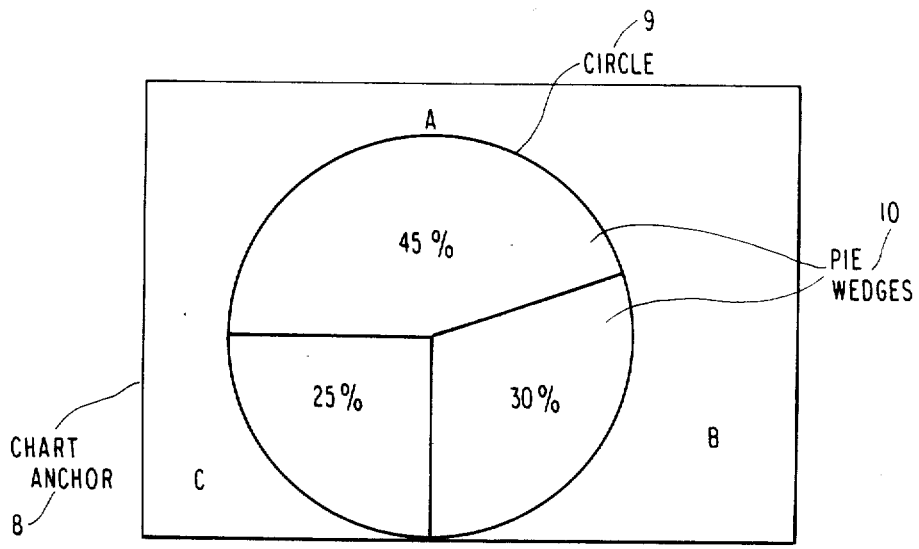
FIG. 2 is a pie chart composed of several primitive draw graphic objects.

FIG. 2 shows a pie chart which is similarly composed of draw graphic primitive objects. For example, the pie chart is composed of a circle 9 representing the pie, and pie wedges 10 representing the individual pieces making up the pie chart. Chart anchor 8 is used as a handle for selecting the entire pie chart.

Referring now to FIG. 3, there is shown a bar chart 13 which it is assumed is being displayed on an all points addressable (APA) cathode ray tube (CRT) or similar display screen of a display device controlled by a stand alone or host connected work station or system. The chart is created upon a user request and is created from data from an existing spreadsheet or data base file or from keyed user input in response to queries from the system. The business graphics application program composes the chart from primitive graphic objects to reflect the data. The application program also maintains a link between the data and the displayed chart.

When the operation is within chart 13, the point of operation can be denoted by cursor 11 illustrated in FIG. 3 as a short arrow. It will of course be recognized that the cursor can be displayed as any type of desired graphic character and provided with attributes such as blink, color and the like. The cursor is preferrably moved with a pointing device such as a mouse or joystick but could also be moved using the keyboard of the computer or work station. As cursor 11 is moved, the point of operation within the chart is moved. Cursor location and movement are directly related to editing. Editing encompasses insertion, deletion, replacement, and other like operations.

As the user moves cursor 11 across the primitive objects making up bar chart 13, the application causes the individual objects to be highlighted. The operator is therefore made aware of the individual primitive objects. For example, bar 12 denotes a primitive object selected by the operator for editing. For the purposes of this invention, the operator desires to change the fill pattern of the selected bar 12 and, therefore, selects the appropriate action. Upon completion of the action, the fill pattern of the selected bar 12 is changed as reflected in FIG. 4. The action merely enhanced the chart and did not affect the data which generated the chart. The integrity of the data represented in bar chart 13 is maintained.

Referring next to FIG. 5, cursor 11 denotes operator selection of bar 14 for editing. For the purposes of this invention, the operator desires to change the size of bar 14 to reflect a more competitive picture of the data representing Company 15. The operator selects the stretch action which results in bar 14 growing as shown in FIG. 6. The result of the action caused bar chart 16 to no longer reflect the data which originally created the chart. The integrity of the data reflected in the chart is compromised and, therefore, the link between the chart and the original data is broken. In other words, the chart remains a chart, but the data is no longer associated with the chart. At this time, the application informs the operator that the link between the chart and the data has been broken. The operator then has the option of undoing the results of the last action.

The following is an illustration of an application program useable by a processor in the workstation or host for interactively manipulating a business chart as a group of draw graph objects. This program is in program design language (PDL) from which source and machine code are derivable. In the following, it is assumed that the work station is under at least keyboard device control and that the operator has initiated an action requiring the system to provide a business graphics editing environment that includes a set of objects with distinctive properties and a set of actions that can be applied to the objects and properties.

```
CALL DISPLAY_CHART(TYPE, DATA)
REPEAT
  CALL GET_INPUT_STATE(INPUT_STATE)
  IF INPUT_STATE = ACTION SELECTION
  THEN IF CHART SUB_OBJECT SELECTED
```

-continued
```
       THEN CALL EDIT_CHART(ACTION, SUB_OBJECT
       RESULT)
       IF RESULT = DATA/CHART RELATIONSHIP
       CHANGED
       THEN CALL BREAK_LINK(CHART, DATA)
       CALL DISPLAY_MSG
       CALL CHANGE_TO_DGGROUP
       ENDIF
       ENDIF
  ELSE IF INPUT_TYPE = OBJECT SELECTION
       THEN CALL DE_HIGHLIGHT(PREV_OBJ)
       CALL GET_CURSOR_LOC(C_LOC)
       CALL QUERY_OBJ_LOC(C_LOC, SUB_OBJECT,
       SELECT)
       IF SELECT
       THEN CALL HIGHLIGHT(SUB_OBJECT)
       ENDIF
  ENDIF
  ENDIF
UNTIL CHART EDITING TERMINATED
```

After the operator indicates that a business chart is to be edited and has specified the type of chart and the source of the data for the chart, the system calls a routine to create and display the chart (CALL DISPLAY_CHART(TYPE, DATA). Following the creation of the chart, the operator can select any object in the chart such as individual bars, lines or pie wedges, and can apply draw graphic actions to the selected object. Applicable actions are stretch, shrink, scale up or down, rotate, move, copy and delete. Actions that update properties of the selected object are unimportant as far as the present invention is concerned.

Next, the system begins to monitor the operator input state. A routine is called to determine the current input state (CALL GET_INPUT_STATE(INPUT_STATE). If the INPUT_STATE = ACTION SELECTION, then the system checks to see if a chart sub_object has been selected. Provided that a sub_object has been selected, a routine is called to edit the chart (CALL EDIT_CHART(ACTION, SUB_OBJECT, RESULT)). ACTION and SUB_OBJECT are input parameters and RESULT is the output parameter. ACTION tells the routine what graphic action is to be performed on the selected object (SUB_OBJECT). RESULT is an output parameter that is used to communicate the effect ACTION had on the chart. If RESULT indicates that the representation of the data in the chart has been changed, destroying the integrity of the chart, the sytem removes the internal link between the chart and the data (CALL BREAK_LINK). Finally, the system displays a message to the operator indicating that the link between the chart and the data has been broken (CALL DISPLAY_MSG), and changes the chart from a business group type to a draw graphics group type (CALL CHANGE_TO_DGGROUP).

If the INPUT_STATE=OBJECT SELECTION, then the system calls a routine (CALL DE_HIGHLIGHT) which turns off the highlighting of any previously selected object (PREV_OBJ). Next, the system queries the location of the cursor (CALL GET_CURSOR_LOC(C_LOC)). The current location of the cursor (C_LOC) is passed as an input parameter in the chart routine (CALL QUERY_OBJ_LOC) that determines if any object in the chart is positioned at C_LOC. If C_LOC is near a chart sub_object, QUERY_OBJ_LOC returns the location of the sub_object (SUB_OBJECT) and turns on a flag (SELECT) indicating that an object is to be selected. If the select flag is on, the system calls a routine to highlight the sub_object to indicate to the operator that the sub_object has been selected (CALL HIGHLIGHT(SUB_OBJECT).

The foregoing steps are repeated until the operator terminates editing the business chart.

Figure 7:
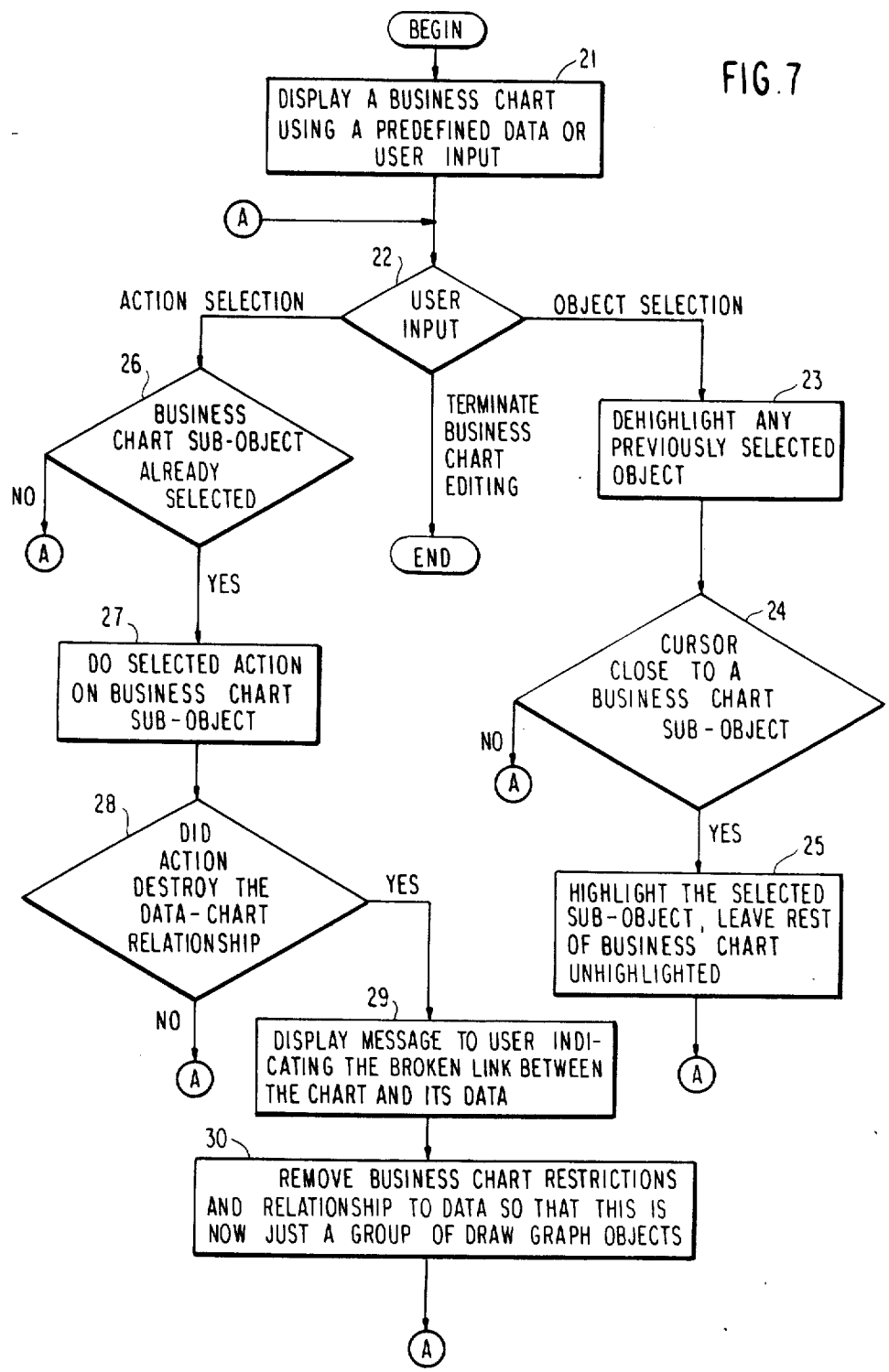
FIG. 7 is a flowchart showing the operation of the invention.

The procedure just described is illustrated in the flow chart shown in FIG. 7 to which reference is now made. In order to start the business graphics editing session, the operator initiates the display of the business chart. The actions required to do this are not detailed here as they have no relevance to the subject invention. Those skilled in the art will understand that the business chart can use data from an existing spreadsheet or data base file or the operator can type the data on the keyboard when queried by the system. The business chart is then displayed in one of several forms (bar chart, pie chart, line chart, scatter chart, or other form provided by the application) depending on a selection by the operator. The chart is generated from draw graph objects such as rectangles, lines, circles and the like. A link is maintained by the system between the business chart and the data from which it was created. All this is accomplished in block 21 of the flow diagram.

Once the chart is created, the operator can start editing it in the same as any graphic object. In block 22, the sytem monitors the operator's input and decides what action to take as a result of that input. So long as the cursor is moved within the business chart area, the system tracks the cursor and highlights any individual object over which the cursor moves. The operator is therefore made aware of the individual graphic objects. Moving the cursor outside the business chart area indicates that the routine is to be terminated. Other actions such as pressing the END (QUIT) key also teminate editing of the chart.

Control passes to block 23 when the OBJECT SELECT key is pressed. In this block, the system dehighlights any other object that may already be highlighted providing feedback to the operator that the previously highlighted object is no longer selected. Next, as indicated in block 24, the system checks to see if the cursor is close enough to any of the business chart sub_objects to select one. If the cursor is not close enough, control returns to block 22. Otherwise, the system highlights the selected sub_object, leaving the rest of the business chart unhighlighted. This action is indicated by block 25 and shows the operator exactly what has been selected.

Control then returns to block 22 where the system resumes monitoring the operator's input. The operator is free at this point to do any available action on the selected object. When the operator selects an action, control passes to block 26 where the system checks that an object has already been selected. If no object has been selected, the action selection is ignored and control is passed back to block 22. If an object has been previously selected, that action is performed on the object as indicated in block 27. The actions valid for a business chart sub_object are the same as those that are valid for any draw graphic object, namely, stretch, shrink, scale up or down, rotate, move, smooth, copy, and delete. The implementation of these actions is not detailed here as it is not the subject of this invention.

Once the action has been completed, the sytem, as shown in block 28, checks to see if the results of the action have made the chart incompatible with the data used to generate the business graph. If there is no data incompatiblity, control returns to block 22. If, however, there is a discrepancy between the chart and the corresponding data, control passes to block 29 where a message is displayed notifying the operator that the information conveyed by the chart is no longer consistent with the data from which it was created. If desired, the operator can undo the action and return the chart to a consistent data state. In block 30, the system removes the link to the data and changes the business chart into a group of draw graph objects. At this point, control returns to block 22.

While the invention has been particularly shown and described with respect to a preferred embodiment thereof, it will be understood by those skilled in the art that changes can be made in form and detail without departing from the scope and spirit of the invention.

Having thus described our invention, what we claim as new, and desire to secure by Letters Patent is:

1. A method of editing a business chart on a computer, said business chart comprising individual object components, said method comprising the steps of:
generating and displaying a business chart using a data structure containing predefined data or user input, said business chart being a group of draw graphic objects associated with one another based on the relationships created by placement of the draw graphic objects on the chart as a function of said data structure;
creating a link from said business chart to said data structure, said link being a reference between said draw graphic objects and said data structure;
directly editing individual draw graphic object components of said business chart using actions provided for draw graphic objects; and
checking said business chart following said step of editing to determine if the integrity of the link from said business chart to said data structure has been compromised by the step of editing a draw graphic object component of said chart.

2. The method according to claim 1 wherein said computer is provided with a cursor movement and selection mechanism, said method further comprising the steps of:
positioning a cursor adjacent to or on an object component of said business chart using said mechanism;
selecting said object component using said mechanism; and
highlighting said object component indicating that a graph object has been selected.

3. The method according to claim 1 wherein the step of editing an object component of said business chart is accomplished with the following steps:
selecting a draw graph action from among a choice of actions including stretch, shrink, scale, rotate, smooth, move, copy or delete; and
performing said action on said object component.

4. The method according to claim 1 including the step of maintaining the link between said business chart and said data structure as long as the integrity of said data has not been compromised by the step of editing an object component of said chart.

5. The method according to claim 4 including the step of breaking the link between said business chart and said data structure if said data has been compromised by the step of editing an object component of said chart.

6. The method according to claim 5 including the step of displaying a message to the user indicating that the link between said business chart and said data structure has been broken.

7. The method according to claim 5 including the step of changing the object components of said business chart to draw graphic objects which are no longer associated with one another based on the relationships created by placement of the draw graphic objects on the chart as a function of said data structure when the link between said business chart and said data has been broken.

8. The method according to claim 1 including the step of maintaining the link between said business chart and said data when only attributes of object components which are not a function of said data structure are changed by said step of editing.

9. The method according to claim 1 including the step of maintaining the link between said business chart and said data when only objects not related to said data structure, but belonging to said chart, are changed by said step of editing.

* * * * *